United States Patent
Chindapol et al.

(10) Patent No.: US 8,213,314 B2
(45) Date of Patent: *Jul. 3, 2012

(54) VIRTUAL SPACE-TIME CODE FOR RELAY NETWORKS

(75) Inventors: Aik Chindapol, Washington, DC (US); Jimmy Chui, Princeton, NJ (US)

(73) Assignee: Nokia Siemens Networks GmbH & Co. KG, München (DE)

( * ) Notice: Subject to any disclaimer, the term of this patent is extended or adjusted under 35 U.S.C. 154(b) by 646 days.

This patent is subject to a terminal disclaimer.

(21) Appl. No.: 11/937,154

(22) Filed: Nov. 8, 2007

(65) Prior Publication Data

US 2008/0175184 A1 Jul. 24, 2008

Related U.S. Application Data

(60) Provisional application No. 60/857,652, filed on Nov. 8, 2006.

(51) Int. Cl.
*G01R 31/08* (2006.01)
*H04B 7/14* (2006.01)
*H04W 4/00* (2009.01)
*H04L 12/28* (2006.01)

(52) U.S. Cl. ........ 370/236; 370/315; 370/328; 370/392; 370/492; 370/501; 375/240.24; 455/7; 455/13.1

(58) Field of Classification Search ........................ None
See application file for complete search history.

(56) References Cited

U.S. PATENT DOCUMENTS

| | | | |
|---|---|---|---|
| 2004/0131025 A1* | 7/2004 | Dohler et al. | 370/328 |
| 2007/0010196 A1* | 1/2007 | Periyalwar et al. | 455/7 |
| 2007/0160014 A1* | 7/2007 | Larsson | 370/338 |
| 2008/0049718 A1* | 2/2008 | Chindapol et al. | 370/351 |
| 2008/0090575 A1* | 4/2008 | Barak et al. | 455/444 |
| 2008/0165720 A1* | 7/2008 | Hu et al. | 370/315 |
| 2010/0165967 A1* | 7/2010 | Kim | 370/338 |

* cited by examiner

*Primary Examiner* — Nittaya Juntima
*Assistant Examiner* — Christine Duong

(57) ABSTRACT

A method for transmitting data in a wireless network includes wirelessly transmitting data from a base station to a plurality of spatially separated relay stations. The data is correlated according to space-time block coding (STBC) for transmission over multiple antennas. The STBC correlated data are wirelessly transmitted from the plurality of spatially separated relay stations to a mobile station. The plurality of spatially separated relay stations cooperate to provide a single multiple antenna transmission.

17 Claims, 2 Drawing Sheets

VIRTUAL SPACE-TIME CODE FOR RELAY NETWORKS

CROSS-REFERENCE TO RELATED APPLICATION

The present application is based on provisional application Ser. No. 60/857,652, filed Nov. 8, 2006, the entire contents of which are herein incorporated by reference.

BACKGROUND OF THE INVENTION

1. Technical Field

The present disclosure relates to relay networks and, more specifically, to virtual space-time code for relay networks.

2. Discussion of the Related Art

Multiple-Input and Multiple-Output (MIMO) relates to techniques for increasing radio communication performance with the use of multiple antennas. By employing MIMO techniques, data throughput and link range may be increased without additional bandwidth or transmit power.

MIMO techniques have been applied to various wireless technologies including cellular networks and Wireless Municipal Area Networks (WMAN) otherwise known as WiMAX. Examples of WiMAX technologies include networks adhering to IEEE 802.16 standards such as IEEE 802.16e mobile WiMAX standards.

In such MIMO systems, Space-Time Block Coding (STBC) is a technique used to transmit multiple copies of a data stream across multiple antennas. As multiple versions of the same data are received, the reliability of data transfer is increased. Accordingly, the error rate of data transmitted using STBC may be substantially lower than for conventionally transmitted data. STBC may be used in systems with multiple transmit antennas even where only a single receiving antenna is used.

A fundamental example of STBC employs the transmission of data correlated in an Alamouti fashion.

$$C = \begin{bmatrix} a & b \\ -b^* & a^* \end{bmatrix}$$

where the rows of the matrix represent time slots and the columns of the matrix represent transmission antennas. The data being transmitted is represented as "a" and "b." The asterisk represents the complex conjugate. Thus in the first time slot, the first antenna transmits "a" and the second antenna transmits "b." Then in the second time slot, the first antenna transmits "$-b^*$" and the second antenna transmits "$a^*$."

Higher-order STBCs are used, however, Alamouti correlation is offered as a simple example, and the present disclosure may be described in terms of this example. It should be understood, however, that other STBC techniques may be used.

Much of the wireless network hardware presently in use, including base stations and relay stations, are not configured for MIMO transmission. Thus, many such base stations and relay stations have only a single transmission antenna. Accordingly, MIMO techniques are not utilized by a large number of existing wireless network hardware.

SUMMARY

A method for transmitting data in a wireless network includes wirelessly transmitting data from a base station to a plurality of spatially separated relay stations. The data is correlated according to space-time block coding (STBC) for transmission over multiple antennas. The STBC correlated data are wirelessly transmitted from the plurality of spatially separated relay stations to a mobile station. The plurality of spatially separated relay stations cooperate to provide a single multiple antenna transmission.

Each of the plurality of spatially separated relay stations may have a single transmission antenna. One or more of the plurality of spatially separated relay stations may have multiple antennas.

The wireless transmission of the data from the base station to the plurality of spatially separated relay stations may include transmitting the data to a single relay station of the plurality of relay stations and allowing the remainder of the relay stations to interpret the instructions transmitted to the single relay station.

The data correlated according to space-time block coding (STBC) for transmission over multiple antennas may be correlated in Alamouti fashion. The base station may determine which relay stations are to wirelessly transmit the STBC correlated data.

There may be two spatially separated relay stations, each with a single transmission antennas, cooperating to provide a single dual-antenna transmission. There may be two spatially separated relay stations, each with two transmission antennas, cooperating to provide a single four-antenna transmission. There may be three spatially separated relay stations, one of which with two transmission antennas and the remainder of which with single transmission antennas, cooperating to provide a single four-antenna transmission.

The wireless network may be a network conforming to IEEE 802.16 standards.

A method for transmitting data in a wireless network includes correlating data according to space-time block coding (STBC) for transmission over multiple antennas. The STBC correlated data may be wirelessly transmitted from a plurality of spatially separated transmission stations to a mobile station. The plurality of spatially separated transmission stations cooperate to provide a single multiple antenna transmission.

The spatially separated transmission stations may be spatially separated relay stations. The plurality of spatially separated transmission stations may include a base station and a relay station.

The data correlated according to space-time block coding (STBC) for transmission over multiple antennas may be correlated in Alamouti fashion.

There may be two spatially separated transmission stations, each with a single transmission antenna, cooperating to provide a single dual-antenna transmission. There may be two spatially separated transmission stations, each with two transmission antennas, cooperating to provide a single four-antenna transmission. There may be three spatially separated transmission stations, one of which with two transmission antennas and the remainder of which with single transmission antennas, cooperating to provide a single four-antenna transmission.

A wireless communications network includes a base station for correlating data according to space-time block coding (STBC) for transmission over multiple antennas, and a plurality of spatially separated relay stations for transmitting the STBC correlated data to a mobile station. The plurality of spatially separated relay stations cooperate to provide a single multiple antenna transmission.

There may be two spatially separated relay stations, each with a single transmission antenna, cooperating to provide a single dual-antenna transmission. There may be two spatially separated relay stations, each with two transmission antennas, cooperating to provide a single four-antenna transmission.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
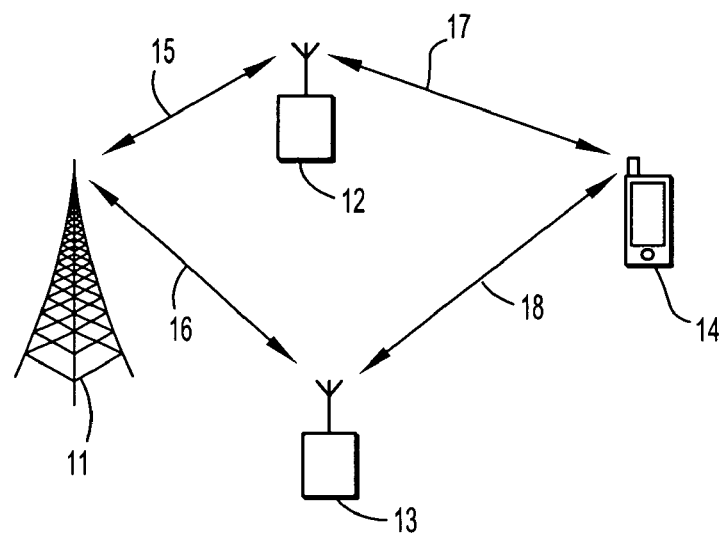
FIG. 1 is a diagram showing a system for implementing a virtual STBC communication using two relay stations according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to employ MIMO techniques on wireless communications hardware, including base stations and relay stations that may lack multiple transmission antennas. This may be achieved, for example, by configuring multiple spatially separated transmission stations, including base stations and relay stations, to cooperate as virtual STBCs. Additionally, exemplary embodiments of the present invention may utilize virtual STBC cooperation to increase communication reliability for transmission stations having multiple antennas.

As discussed above, Alamouti correlations are used as an example of an STBC technique. Thus the virtual STBCs are described herein as a combination of either two relay stations or one relay station and one base station that act in cooperation to transmit Alamouti correlated data. The data may include rate 1 codes, as a performance increase may be achieved without an increase in backhaul communication. Rate 1 codes are specified in IEEE 802.16-2004 and 802.16e-2005, for example, "code A" in sections 8.4.8.1.4, 8.4.8.3.3 for two transmitting antennas, and 8.4.8.2.3, 8.4.8.3.5 for four transmitting antennas. These standards are herein incorporated by reference.

Two Antenna Virtual STBC

Exemplary embodiments of the present invention may utilize two discrete specially-separated transmitting stations to cooperate as a single virtual STBC station, for example, to transmit correlated data in Alamouti fashion. FIG. 1 is a diagram showing a system for implementing a virtual STBC communication using two relay stations according to an exemplary embodiment of the present invention. Here, a base station 11 is in communication with a first relay station 12 along a wireless connection 15, and a second relay station 13 along a wireless connection 16. The base station 11 may then transmit data to the relay stations 12 and 13. For example, the base station 11 may transmit data to the first relay station 12 along the wireless connection 15 and to the second relay station 13 along the wireless connection 16.

Alternatively, the base station 11 may communicate with only a single relay station, for example, the first relay station 12, along a single wireless connection, for example 15. The additional backhaul of the base station 11 communicating with the second relay station 13 along the wireless connection 16 may not be necessary as the second relay station 13 may be able to listen to the communication between the base station 11 and the first relay station 12, for example, when rate 1 codes are transmitted.

The two relay stations may then cooperate to act as a single virtual STBC in connection with a mobile station 14. For example, the first relay station 12 may transmit to the mobile station 14 "(a, −b*)" data along a wireless connection 17 and the second relay station 13 may transmit to the mobile station 14 "(b, a*)" data along a wireless connection 18. Accordingly, the mobile station may receive data correlated in an Alamouti fashion as if having been received from a single relay station with multiple antennas. Moreover, because of the increased spatial separation between the first relay station 12 and the second relay station 13 as compared with the spatial separation between two antennas of a single two-antenna relay station, virtual STBC arrangements as herein disclosed may provide increased transmission reliability compared with both conventional single-antenna transmission and MIMO transmission by an actual STBC arrangement.

Upon receiving the data from the relay stations 12 and 13, the mobile station 14 may perform Alamouti decoding in accordance with existing standards.

Additionally, when employing the system as shown in FIG. 1, the base station may determine when it is preferable to have the relay stations 12 and 13 perform in the conventional "simple relaying" manner and when it is preferable to have the relay stations 12 and 13 cooperate using virtual STBC. If during the backhaul, decoding at a relay station is not error free, then the relay may fail to perform the relay operation. To the mobile station 14, the failure for a relay station to relay information may be perceived as a deep fade. In retransmitting the information, the base station may then reconfigure how the information is sent, for example, by performing conventional relay transmission.

Figure 2:
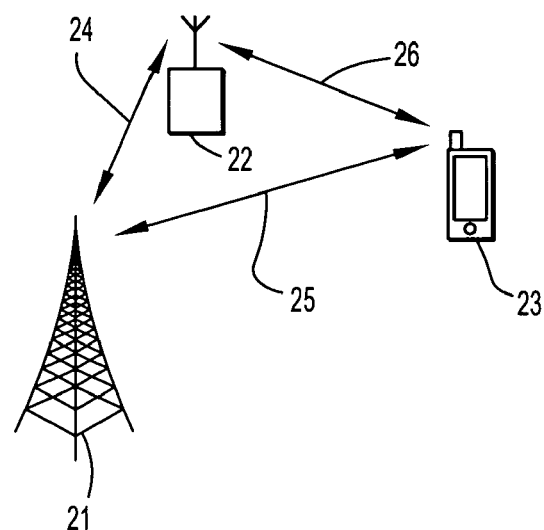
FIG. 2 is a diagram showing a system for implementing virtual STBC communication using a single relay station according to an exemplary embodiment of the present invention.

Alternatively, a base station may act in cooperation with a single relay station to perform virtual STBC. FIG. 2 is a diagram showing a system for implementing virtual STBC communication using a single relay station according to an exemplary embodiment of the present invention. Here, a base station 21 may communicate with a relay station 22 over a wireless connection 24 to cooperate with the relay station 22 to operate as a single virtual STBC transmission station communicating with the mobile terminal 23 along a first wireless communication path 25 between the base station 21 and the mobile terminal 23 and a second wireless communication path 26 between the relay station 22 and the mobile terminal 23 in a manner similar to the approached described above with respect to FIG. 1.

Four Antenna Virtual STBC

Figure 3:
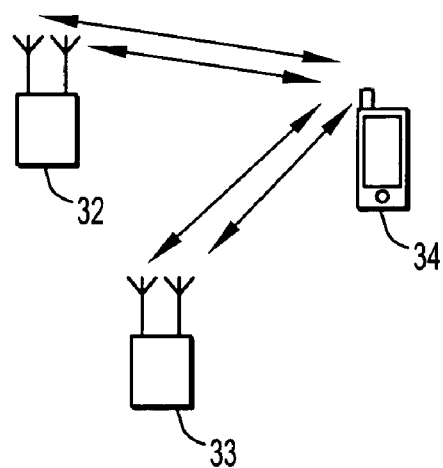
FIG. 3 is a diagram showing a system for implementing a virtual STBC communication using two relay stations each having two antennas according to an exemplary embodiment of the present invention.

Exemplary embodiments of the present invention may utilize multiple discrete relay stations each having multiple antennas to communicate with a mobile station. FIG. 3 is a diagram showing a system for implementing a virtual STBC communication using two relay stations each having two antennas according to an exemplary embodiment of the present invention. As can be seen from FIG. 3, a first relay station 32 having two antennas may cooperate with a second relay station 33 also having two antennas to communicate with a mobile station 34.

As in the exemplary embodiment described above with respect to FIG. 1, a base station (not shown) may communicate wirelessly with both of the relay stations 32 and 33. Alternatively, the base station may communicate with only a single relay station, for example, the first relay station 32, along a single wireless connection. The additional backhaul of the base station communicating with the second relay station 33 along a second wireless connection may not be necessary as the second relay station 33 may be able to listen to the communication between the base station and the first relay station 32.

The first relay station 32 having two antennas may then cooperate with the second relay station 33 having two antennas to act as a single virtual STBC having four antennas in connection with the mobile station.

This may be achieved, for example, by having the antennas transmit correlated data in Alamouti fashion using four antennas. An example of four-antenna communication may be found, for example, as Code C in Section 8.4.8.2.3, 8.4.8.3.5 of the IEEE 802.16 standard.

For example, the four-antenna virtual STBC may transmit data correlated in the following configuration:

$$C = \begin{bmatrix} a & 0 & b & 0 \\ -b^* & 0 & a & 0 \\ 0 & c & 0 & d \\ 0 & -d^* & 0 & c \end{bmatrix}$$

where the first antenna of the first relay station 32 transmits (a, $-b^*$, 0, 0) in four time slots, respectively; the second antenna of the first relay station 32 transmits (0, 0, c, $-d^*$) in the four time slots, respectively; the first antenna of the second relay station 33 transmits (b, a, 0, 0) in the four time slots, respectively; and the second antenna of the second relay station 33 transmits (0, 0, d, c) in the four time slots, respectively.

This data correlation is offered as a simple example of data correlation in four-antenna MIMO and other correlations may be used.

The relay stations may act independently as conventional double-antenna relay stations or may cooperate as a virtual STBC to provide increased transmission reliability. The determination of how to employ each relay station may be handled by the base station based on reception conditions and network load.

The mobile terminal 34 may receive the data transmitted from the relay stations 32 and 33 and may perform Alamouti decoding in accordance with existing standards.

In other respects not discussed, the four-antenna approach may be similar to the two-antenna approach discussed above.

Figure 4:
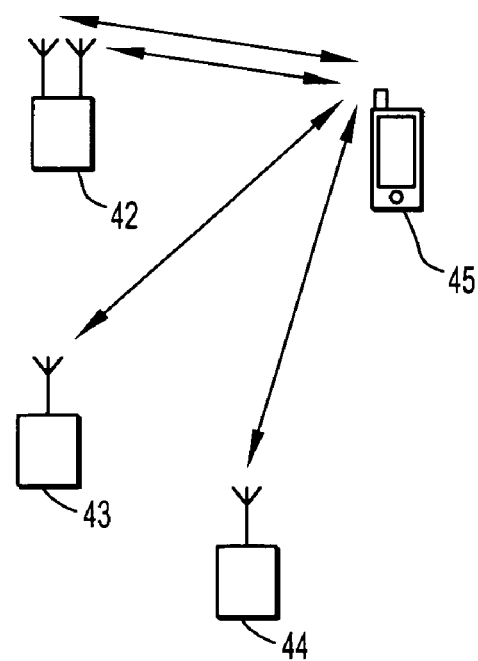
FIG. 4 is a diagram showing a system for implementing a virtual STBC communication using three relay stations, one of which having two antennas according to an exemplary embodiment of the present invention.

FIG. 4 is a diagram showing a system for implementing a virtual STBC communication using three relay stations, one of which having two antennas according to an exemplary embodiment of the present invention. Here, a first relay station 42 having two antennas cooperates with a second relay station 43 and a third relay station 44 each having one antenna for implementing four-antenna virtual STBC communication with a mobile station 45. In other respects, this approach is similar to the four-antenna approach discussed above.

The techniques as herein described may be extended to provide virtual STBC having any number of antennas using any number of relay stations each having any number of antennas. In each such approach, multiple transmission stations (base stations and/or relay stations) may cooperate to form as a virtual STBC.

As described above, relay stations within the wireless network may receive commands from the base station dictating whether to act independently to perform simple relaying or whether to act cooperatively in virtual STBCs. The base station may transmit these commands to the relay stations wirelessly, for example, along with normal data. The base station may determine how best to utilize the available relay stations based on factors such as transmission reliability and available network capacity. The base station may perform these functions using a computer system executing one or more applications for relay station control.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for transmitting data in a wireless network, comprising:
    determining, by a base station, whether to instruct a plurality of spatially separated relay stations to relay data from the base station to a mobile station by performing conventional data transmission or to instruct the plurality of spatially separated relay stations to relay data by transmitting the data in a cooperative manner to provide a single virtual space-time block coding (STBC) transmission, the determining being based on reception conditions of the wireless network;
    wirelessly transmitting, from the base station to the relay stations, an instruction signal instructing the relay stations to relay the data in the cooperative manner according to the determination based on the reception conditions;
    correlating, by the relay stations, the data according to STBC for transmission over multiple antennas; and
    wirelessly transmitting the STBC correlated data from the relay stations to the mobile station in response to the instruction signal, wherein the relay stations cooperate to provide a single multiple antenna transmission,
    wherein wirelessly transmitting the STBC correlated data from the plurality of spatially separated relay stations to the mobile station is prevented when one or more of the relay stations fails to correctly decode the data.

2. The method of claim 1, wherein each of the plurality of spatially separated relay stations have a single transmission antenna.

3. The method of claim 1, wherein one or more of the plurality of spatially separated relay stations have multiple antennas.

4. The method of claim 1, wherein the wirelessly transmitting the data from the base station to the relay stations includes receiving, at a first relay station, the data communicated by the base station to the first relay station of the plurality of relay stations and allowing the remainder of the plurality of relay stations to listen to receive the data from the base station.

5. The method of claim 1, wherein the data correlated according to space-time block coding (STBC) for transmission over multiple antennas is correlated in Alamouti fashion.

6. The method of claim 1, wherein the base station determines which relay stations are to wirelessly transmit the STBC correlated data.

7. The method of claim 1, wherein there are two spatially separated relay stations, each with a single transmission antenna, cooperating to provide a single dual-antenna transmission.

8. The method of claim 1, wherein there are two spatially separated relay stations, each with two transmission antennas, cooperating to provide a single four-antenna transmission.

9. The method of claim 1, wherein there are three spatially separated relay stations, one with two transmission antennas and the remainder with single transmission antennas, cooperating to provide a single four-antenna transmission.

10. The method of claim 1, wherein the wireless network is a network conforming to IEEE 802.16 standards.

11. A method for transmitting data in a wireless network, comprising:
    determining, by a base station, whether to instruct a plurality of spatially separated transmission stations to relay data from the base station to a mobile station by performing conventional data transmission or to instruct the plurality of spatially separated transmission stations to relay data by transmitting the data in a cooperative manner to provide a single virtual space-time block coding (STBC) transmission, the determining being based on a load of the wireless network;
    wirelessly transmitting, from the base station to the transmission stations, an instruction signal instructing the transmission stations to relay data in the cooperative manner according to the determination based on the load, wherein each transmission station is configured to transmit data by either performing the conventional data transmission or by transmitting data in the cooperative manner with at least one other transmission station;
    correlating, by the transmission stations, the data according to STBC for transmission over multiple antennas; and
    wirelessly transmitting the STBC correlated data from the plurality of spatially separated transmission stations to the mobile station in response to the instruction signal, wherein the transmission stations cooperate to provide a single multiple antenna transmission,
    wherein wirelessly transmitting the STBC correlated data from the plurality of spatially separated transmission stations to the mobile station is prevented when one or more of the transmission stations fails to correctly decode the data.

12. The method of claim 11, wherein the data correlated according to space-time block coding (STBC) for transmission over multiple antennas is correlated in Alamouti fashion.

13. The method of claim 11, wherein there are two spatially separated transmission stations, each with a single transmission antenna, cooperating to provide a single dual-antenna transmission.

14. The method of claim 11, wherein there are two spatially separated transmission stations, each with two transmission antennas, cooperating to provide a single four-antenna transmission.

15. The method of claim 11, wherein there are three spatially separated transmission stations, one with two transmission antennas and the remainder with single transmission antennas, cooperating to provide a single four-antenna transmission.

16. A wireless communications network, comprising:
    a base station configured to:
        determine whether to instruct a plurality of spatially separated relay stations to relay data from the base station to a mobile station by performing conventional data transmission or to instruct the plurality of spatially separated relay stations to relay data by transmitting the data in a cooperative manner to provide a single virtual space-time block coding (STBC) transmission, the determining being based on reception conditions of the wireless network; and
        wirelessly transmit an instruction signal instructing the relay stations to relay the data in the cooperative manner according to the determination based on the reception conditions; and
    the plurality of spatially separated relay stations, each configured to:
        transmit data by either performing conventional data transmission or by transmitting data in the cooperative manner with at least one other relay station to provide a single STBC transmission;
        transmit STBC correlated data to the mobile station in response to the instruction signal from the base station; and
        prevent the transmitting STBC correlated data as instructed by the base station when one or more of the relay stations fails to correctly decode the data,
        wherein the plurality of spatially separated relay stations cooperate to provide a single multiple antenna transmission.

17. The system of claim 16, wherein there are two spatially separated relay stations, each with a single transmission antenna, cooperating to provide a single dual-antenna transmission.

* * * * *